United States Patent
Brown et al.

(10) Patent No.: US 11,898,329 B2
(45) Date of Patent: Feb. 13, 2024

(54) HYDRAULIC CONTROL CIRCUIT FOR IMPLEMENT

(71) Applicant: Clark Equipment Company, West Fargo, ND (US)

(72) Inventors: Ian Brown, Bismarck, ND (US); Jason Legatt, Bismarck, ND (US)

(73) Assignee: DOOSAN BOBCAT NORTH AMERICA INC., West Fargo, ND (US)

( * ) Notice: Subject to any disclaimer, the term of this patent is extended or adjusted under 35 U.S.C. 154(b) by 0 days.

(21) Appl. No.: 18/217,309

(22) Filed: Jun. 30, 2023

(65) Prior Publication Data
US 2024/0003120 A1   Jan. 4, 2024

Related U.S. Application Data

(60) Provisional application No. 63/357,976, filed on Jul. 1, 2022.

(51) Int. Cl.
*E02F 9/22* (2006.01)
*F15B 7/00* (2006.01)

(52) U.S. Cl.
CPC ............ *E02F 9/2296* (2013.01); *F15B 7/006* (2013.01); *F15B 2211/20553* (2013.01); *F15B 2211/3058* (2013.01)

(58) Field of Classification Search
CPC . E02F 9/2296; F15B 7/006; F15B 2211/3058; F15B 2211/20553
See application file for complete search history.

(56) References Cited

U.S. PATENT DOCUMENTS

| | | |
|---|---|---|
| 3,833,961 A | 9/1974 | Fortman et al. |
| 4,043,419 A | 8/1977 | Larson et al. |
| 4,343,151 A | 8/1982 | Lorimor |
| 4,508,013 A | 4/1985 | Barbagli |
| 5,493,950 A | 2/1996 | Kim |
| 5,946,911 A | 9/1999 | Buschur et al. |
| 6,018,895 A | 2/2000 | Duppong et al. |

(Continued)

FOREIGN PATENT DOCUMENTS

EP    1 843 047 A2    10/2007

OTHER PUBLICATIONS

International Search Report and Written Opinion for International Application N. PCT/US2023/026788, dated Oct. 19, 2023, 15 pages.

*Primary Examiner* — Abiy Teka
(74) *Attorney, Agent, or Firm* — Westman, Champlin & Koehler, P.A.

(57) ABSTRACT

Disclosed embodiments of power machines, implements and hydraulic systems utilize a hydraulic flow control circuit and method to implement multiple modes of operation while optimizing hydraulic fluid flow to either or both of primary and secondary function actuators. In a first mode the hydraulic flow control circuit is configured to receive pressurized hydraulic fluid flow from a first conduit and to provide the pressurized hydraulic fluid to the primary and secondary function actuators. In the first mode, the circuit is configured to direct return flow from the primary and secondary function actuators through the second conduit for return to the power machine. In a second mode, the circuit receives flow from the second conduit, provides the flow only to the secondary function actuator, and directs the return flow to the power machine through the first conduit.

19 Claims, 11 Drawing Sheets

(56) References Cited

U.S. PATENT DOCUMENTS

| | | |
|---|---|---|
| 6,220,027 B1 | 4/2001 | Heusser |
| 6,354,081 B1 | 3/2002 | Burton |
| 6,520,593 B2 | 2/2003 | Dvorak et al. |
| 6,662,556 B2 | 12/2003 | Bares et al. |
| 6,681,568 B2 | 1/2004 | Smith |
| 7,293,494 B2 | 11/2007 | Morency et al. |
| 7,900,445 B2 | 3/2011 | Brockmann |
| 10,306,827 B2 | 6/2019 | Millie |
| 10,677,269 B2 | 6/2020 | Lippett |
| 11,078,645 B2 | 8/2021 | Yumoto et al. |
| 2003/0197420 A1 | 10/2003 | Burton |
| 2007/0235078 A1 | 10/2007 | Brockmann |
| 2009/0053078 A1 | 2/2009 | Keuper et al. |
| 2013/0226415 A1 | 8/2013 | Smith et al. |

HYDRAULIC CONTROL CIRCUIT FOR IMPLEMENT

CROSS-REFERENCE TO RELATED APPLICATION(S)

The application claims the benefit of U.S. provisional application No. 63/357,976, filed 1 Jul. 2022, the content of which is hereby incorporated by reference in its entirety.

BACKGROUND

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Loaders and other power machines typically utilize a hydraulic system including one or more hydraulic pumps, in conjunction with control valves and actuators, to power travel motors, to raise, lower, and, in some cases, extend and retract a boom or an arm, to power hydraulic implements operably coupled to the power machine, and the like. Many hydraulic implements that are capable of being operably coupled to, and receive hydraulic fluid from a power machine have a primary function and one or more secondary functions which are all hydraulically powered. That is, such implements accomplish a plurality of functions through hydraulic devices located on the implement, with a primary function supported by secondary functions. For example, cutting type implements such as planers, slab cutters, and stump grinders, have a hydraulic motor driven cutting wheel or drum for cutting a material and this cutting wheel is a primary function on the implement. Secondary functions of such an implement include functions that position or move the cutting wheel or drum to desired positions, in desired patterns, at desired speeds or patterns to achieve feed rates, etc. For example, in a planer, one secondary function is a side shift function, while two other secondary functions control left and right moving skis. In another example, in a stump grinder, one secondary function is an arm raising or lowering function that positions the cutting wheel. Another secondary function of a stump grinder controls lateral movement of the cutting wheel.

On some conventional implements of this type, hydraulic fluid for the implement is provided from a hydraulic system on the power machine to a first coupler, often a male coupler, on the implement primarily for purposes of performing the primary function. The conventional implement is further capable of diverting small amounts of hydraulic fluid to perform the secondary functions, i.e., the diverted fluid is not provided to the primary function. Because providing flow to the primary function is deemed to be the highest priority on conventional implements, relatively little flow may be left to provide to secondary functions, leaving the secondary functions less than optimally supplied with hydraulic fluid and therefore the secondary functions often operate more slowly than desired. In addition, diversion of hydraulic fluid from the primary function, for example from a hydraulic motor, can result in the primary function operating at a less than peak level. When the primary function is not active but an operator wishes to employ secondary functions to, for example, position the primary element, conventional implements employ the same diversion technique, resulting in a large amount of oil being provide to the implement, only a relatively small portion of which is provided through a diverter to the secondary device or devices that are being actuated. The remainder of the hydraulic fluid is merely returned to tank through a return line and corresponding second coupler. The entire process results in the creation of unwanted heat in the hydraulic system. In addition, the secondary functions still often operate more slowly than desired.

In some existing implements of this type, when the primary function is not active but an operator wishes to employ secondary functions, to address the issues of unwanted heat in the system or slow operation of the secondary functions, a selectable hydraulic flow circuit on the implement is utilized. In one such conventional implement, to provide hydraulic power to the secondary functions when the primary function is not active, hydraulic fluid for the implement is provided to the second coupler, which otherwise is used to return oil to tank. Hydraulic fluid returning from the secondary functions is then returned to tank through a case drain line of the primary function motor. While this technique provides selectable provision of hydraulic fluid to the primary and secondary functions, alone or in combination, it can present disadvantages. For example, during primary function motor operation and secondary function actuator operation, high pressure from the secondary actuators is communicated back to the motor via the motor case drain line, often at a pressure higher than the case pressure specification of the motor.

The discussion in this Background is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter.

Disclosed embodiments of power machines, implements and hydraulic systems utilize a hydraulic flow control circuit and method to implement multiple modes of operation while optimizing hydraulic fluid flow to either or both of primary and secondary function devices or actuators. In a first mode of operation, the hydraulic flow control circuit receives pressurized hydraulic fluid flow from a first conduit and provides the pressurized hydraulic fluid flow to the primary function actuator and to the secondary function actuator, while directing return flow of hydraulic fluid from both of the primary and secondary function actuators through a second conduit for return to the power machine. In a second mode of operation, the hydraulic flow control circuit receives pressurized hydraulic fluid flow from the second conduit, prevents flow of pressurized hydraulic fluid to the primary function actuator, provides the pressurized hydraulic fluid flow to the secondary function actuator. In the second mode, the hydraulic flow control circuit is configured to direct return flow of hydraulic fluid from the secondary function actuator through the first conduit for return to the power machine.

In an exemplary embodiment, a hydraulic system is provided for selectively providing pressurized hydraulic fluid flow to actuators on an implement (20) configured to be hydraulically coupled to a power machine (10). The implement has a primary function actuator (125) and at least one secondary function actuator (130). For the purposes of this discussion, the primary function actuator refers to an actuator that performs the primary function of the implement. For example, on a planer, the primary function actuator is a motor that provides a rotating action to plane material from a surface. In some embodiments, the primary function actuator is a continual function actuator. In other words, the primary function actuator is being actuated continuously during the primary duty cycle of the actuator. Further, a secondary function actuator, for the purposes of this discussion, refers to an actuator that provides a secondary function such as positioning the primary function actuator or other function that is not the primary function. For example, on a planar, a side shift function for shifting the planar head would be a secondary function. The hydraulic system includes a hydraulic interface including first (120) and second (121) conduits coupleable to the power machine, wherein each of the first and second conduits are configured to selectively receive pressurized hydraulic fluid from the power machine, and wherein the implement is configured to receive pressurized hydraulic fluid flow from only one of the first and second conduits at a time. The hydraulic system also includes a hydraulic flow control circuit (135; 235; 335; 435; 535) configured to selectively control pressurized hydraulic fluid flow to and from the primary function actuator (125) and to and from at least one secondary function actuator (130) in first and second modes of operation.

In the first mode of operation, the hydraulic flow control circuit is configured to receive pressurized hydraulic fluid flow from the first conduit (120) and to provide the pressurized hydraulic fluid flow to the primary function actuator (125) and to the at least one secondary function actuator (130). Also in the first mode of operation, the hydraulic flow control circuit is configured to direct return flow of pressurized hydraulic fluid from the primary function actuator (125) and from the at least one secondary function actuator through the second conduit (121) for return to the power machine. In the second mode of operation, the hydraulic flow control circuit is configured to receive pressurized hydraulic fluid flow from the second conduit (121), to prevent flow of pressurized hydraulic fluid flow to the primary function actuator (125), and to provide the pressurized hydraulic fluid flow to the at least one secondary function actuator (130). In the second mode of operation, the hydraulic flow control circuit is configured to direct return flow of pressurized hydraulic fluid from the at least one secondary function actuator (130) through the first conduit (120) for return to the power machine.

In an exemplary embodiment, the primary function actuator (125) includes a motor (205) having an inlet port (A) and an outlet port (B), and the hydraulic flow control circuit is configured to prevent pressurized hydraulic fluid flow into the outlet port in both of the first and second modes of operation. In some embodiments, the hydraulic interface includes a third conduit (122) coupleable to the power machine, and the motor (205) of the primary function actuator is in communication with the third conduit to allow hydraulic fluid leaked in the motor to exit the motor.

In an exemplary embodiment, the hydraulic flow control circuit includes a first blocking device (210; 310; 410; 510) coupled to the outlet port (B) of the motor (205) configured to prevent pressurized hydraulic fluid flow into the outlet port. Further, in an exemplary embodiment, the hydraulic flow control circuit includes a shuttle valve (214) coupled between the first conduit (120) and the second conduit (121), the hydraulic flow control circuit configured such that a center connection (220) of the shuttle valve provides pressurized hydraulic fluid flow to the at least one secondary function actuator (130) from the first conduit (120) in the first mode of operation and from the second conduit (121) in the second mode of operation. In other exemplary embodiments, a valve configuration (214A) including two inward facing check valves (216, 218) is utilized instead of a shuttle valve.

In another exemplary embodiment, the hydraulic flow control circuit is configured such that return flow from the at least one secondary function actuator is provided to a center node (234) between second (230) and third (232) blocking devices, the second blocking device (230) coupled between the center node (234) and the first conduit (120) and the third blocking device (232) coupled between the center node (234) and the second conduit (121). The second and third blocking devices are configured such that return flow from the at least one secondary function actuator (130) is directed through the second conduit (121) in the first mode of operation and through the first conduit (120) in the second mode of operation.

In other exemplary embodiments, the hydraulic flow control circuit includes a first two-position control valve (302; 402; 502 having a first position (304; 404; 504) in the first mode of operation and a second position (306; 406; 506) in the second mode of operation. In the first mode of operation the first two-position control valve couples the first conduit to the at least one secondary function actuator (130) to provide the pressurized hydraulic fluid flow to the at least one secondary function actuator, and couples return flow of pressurized hydraulic fluid from the primary function actuator and from the at least one secondary function actuator to the second conduit (121) for return to the power machine. In some exemplary embodiments, in the first mode of operation, the first two-position control valve (302; 402; 502) also couples the first conduit (120) to the primary function actuator (125) to provide the pressurized hydraulic fluid flow to the primary function actuator. In the second mode of operation the first two-position control valve (302; 402; 502) couples the second conduit (121) to the at least one secondary function actuator (130) to provide the pressurized hydraulic fluid flow to the at least one secondary function actuator, and couples return flow of pressurized hydraulic fluid from the at least one secondary function actuator to the first conduit (120) for return to the power machine.

In still other exemplary embodiments, the hydraulic flow control circuit includes a second two-position control valve (514) having a first position (516) in the first mode of operation and a second position (518) in the second mode of operation. In the first mode of operation the second two-position control valve couples the first conduit to the primary function actuator (125) to provide the pressurized hydraulic fluid flow to the primary function actuator.

BRIEF DESCRIPTION OF THE DRAWINGS

FIGS. 2-1 and 2-2 are hydraulic schematic diagrams illustrating hydraulic components on the implement, shown in FIG. 1, including components of a first embodiment of the selectable hydraulic flow control circuit.

FIGS. 2-3 and 2-4 are hydraulic schematic diagrams illustrating a variation of the embodiment of the selectable hydraulic flow control circuit shown in FIGS. 2-1 and 2-2.

FIGS. 3-1 and 3-2 are hydraulic schematic diagrams illustrating hydraulic components on the implement, shown in FIG. 1, including components of a second embodiment of the selectable hydraulic flow control circuit.

FIGS. 4-1 and 4-2 are hydraulic schematic diagrams illustrating hydraulic components on the implement, shown in FIG. 1, including components of a third embodiment of the selectable hydraulic flow control circuit.

FIGS. 5-1 and 5-2 are hydraulic schematic diagrams illustrating hydraulic components on the implement, shown in FIG. 1, including components of a fourth embodiment of the selectable hydraulic flow control circuit.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed concepts are used to provide selectable flow to either or both of a primary function device or actuator, such as a motor of a tool, and one or more secondary function devices or actuators using a selectable hydraulic flow control circuit on an implement and by controlling the supply of hydraulic fluid to first and second couplers, depending upon whether the primary function is active or whether only the secondary functions are active.

Figure 1:
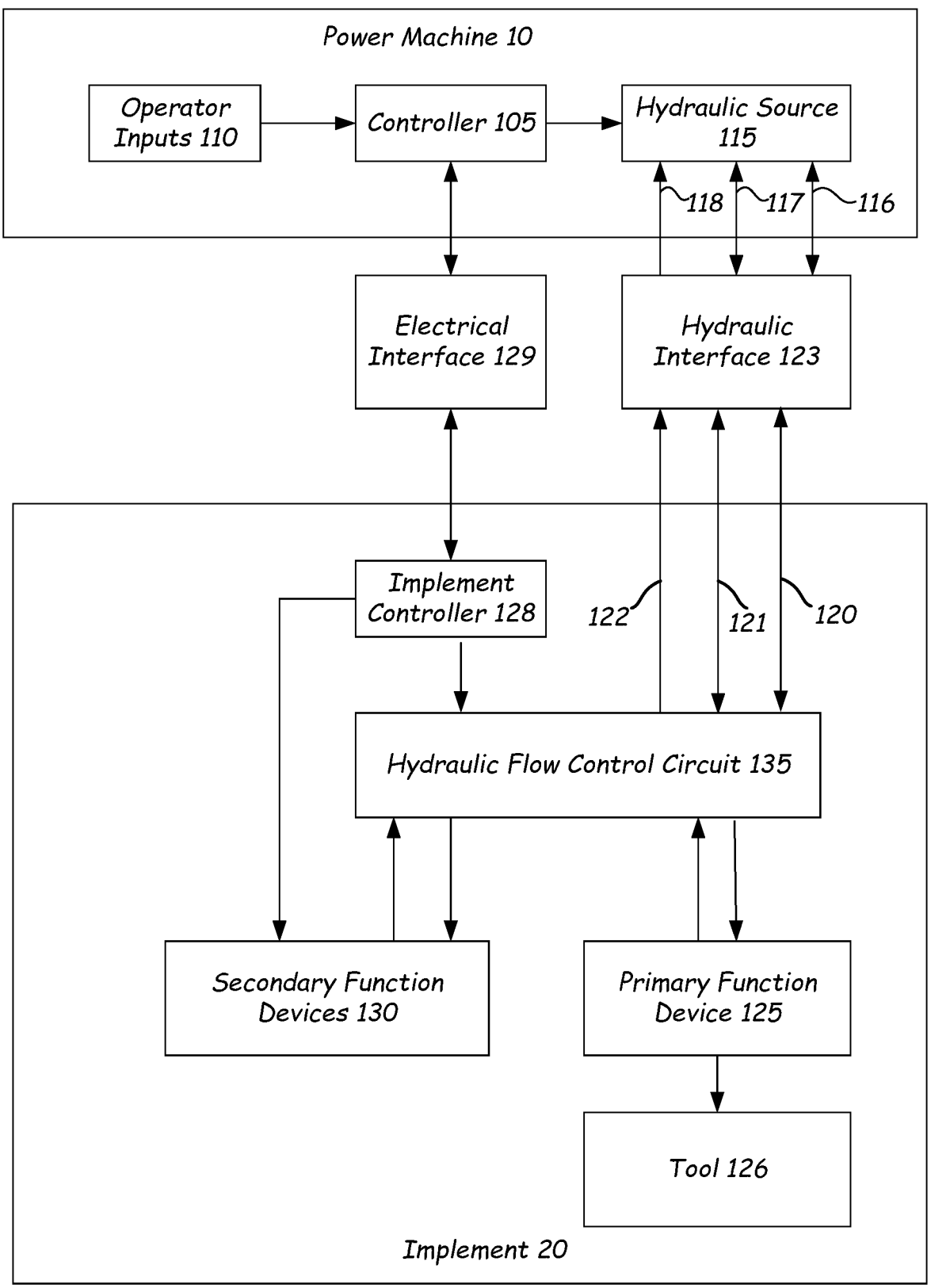
FIG. 1 is a block diagram illustrating a power machine having a hydraulic system coupled to an implement with a selectable hydraulic flow control circuit controlling hydraulic fluid flow to primary and secondary functions of the implement.

Referring to FIG. 1, a power machine 10, operably coupled to, and in hydraulic communication with, an implement 20 is schematically illustrated. Power machine 10 can be, for example, a loader, utility vehicle, telehandler, excavator, or other types of machines, mobile or otherwise, that provide a hydraulic source capable of being coupled to hydraulic devices on an implement. Implement 20 can be any of a number of different types of work implements configured to be hydraulically coupled to the power machine 10 such that hydraulic power for operating the implement is provided from a hydraulic system on the power machine. In an exemplary embodiment, power machine 10 is a loader and implement 20 is a cutting type implement such as a planer, a slab cutter, a stump grinder, etc. However, power machine 10 is not limited to being a loader and implement 20 is not limited to being a cutting type implement. Generally, implement 20, for the purposes of this discussion, can be any hydraulically powered implement having a primary function and one or more secondary functions. In an exemplary embodiment described herein, the primary function is a cutting or grinding function performed by a hydraulic motor driven cutting wheel, drum, or other tool. In the exemplary embodiment, the secondary functions of the implement are functions that position or move the cutting wheel, drum, or other tool to desired positions, in desired patterns, at desired speeds or speed patterns to achieve feed rates, etc.

A first example of an implement that implement 20 of FIG. 1 generally represents is a planer. An exemplary planer has a hydraulically controlled primary device, such as toothed drum, that is capable of grinding concrete, asphalt, and the like in a planing operation. Secondary devices on the planer illustratively include devices such as hydraulically controlled linear actuators that are capable of positioning the primary device as desired. For example, some planers have a side shift function capable of lateral positioning of the primary device. In addition, hydraulically controlled left and right skis can be manipulated to adjust the primary device vertically. A second example of an implement of the type where the concepts discussed herein can be usefully employed is a stump grinder. An exemplary stump grinder has a toothed wheel supported by an arm and capable of cutting a tree stump as a primary device. Secondary devices illustratively include an arm raising or lowering device and a telescoping device for positioning the cutting wheel and a lateral movement device that controls lateral movement of the cutting wheel while grinding a tree stump. A third example implement is a concrete cutting implement that is capable of cutting a relatively narrow trench into concrete and similar materials. The concrete cutting implement has a primary device in the form of a cutting wheel and secondary devices in the form of lateral and vertical adjustment devices for the cutting wheel and a feed drive to pull the wheel through a cut. These examples are but three from a large number of implements upon which the disclosed embodiments may be advantageously utilized.

In one example embodiment, power machine 10 has a controller 105, for example, an electronic control device that is in electrical communication with one or more operator input devices 110 that can be manipulated or actuated by an operator. In one embodiment, controller 105 is a single, microprocessor based electronic control device. Alternatively, controller 105 can take on a number of different forms. Controller 105, as shown in FIG. 1, can represent a plurality of electronic control devices on the power machine that are capable of communicating with each other in a distributed computing arrangement. The power machine 10 can have any number of operator input devices 110 and each of these input devices has an actuation mechanism such as a switch, slider, button, variable input device, or a touch screen display, to name but a few non-limiting examples. Each of the operator input devices 110 illustratively provides a signal indicative of its actuation state to the controller 105. The signal from any particular input device can be a voltage or a current level, or a digital communication string according to any communication protocol. Such a communication string can be provided via a hardwired connection with an operator input device or via a wireless communication scheme. Any other suitable communication means or combination of communication means between operator inputs and the controller 105 may be employed without departing from the scope of the disclosure. It should be appreciated that while the operable inputs 110 are schematically shown in FIG. 1 as being located on the power machine 10, in alternate embodiments, the operator inputs can be located on any device capable of communicating indications of operator input actuations to the implement 20. For the purposes of this discussion, actuable operator inputs 110 refers to input devices actuable to control functions related to the implement 20.

The controller 105 illustratively provides control signals to a hydraulic power source 115, which, in turn, is configured to provide hydraulic fluid to hydraulic components on the implement 20 in one of two directions via hydraulic conduits 116 and 117, depending at least in part on the control signals provided to the controller 105 from the operator inputs 110 when the implement 20 is in hydraulic communication with the power machine 10. The hydraulic power source 115 illustratively includes a hydraulic pump and the necessary hydraulic components such as a valve (not shown), such that when the power machine 10 provides pressurized hydraulic fluid via hydraulic conduit 116, hydraulic conduit 117 is configured to receive return flow from the implement, return flow that eventually is returned to a hydraulic reservoir (not shown), thereby making the hydraulic fluid available to an inlet of the hydraulic pump. In exemplary embodiments, when operator inputs 110 are actuated in a manner which commands that the primary device be powered, for example by providing hydraulic fluid flow to the associated primary device motor, pressurized hydraulic fluid is provided to the implement via the first hydraulic conduit 116, and is returned via the second hydraulic conduit 117. In this command scenario, hydraulic fluid flow from first hydraulic conduit 116 is also available to secondary function actuators and devices when commanded by the operator inputs, with return flow from the secondary functions being combined with flow from the primary function device and returned through the second hydraulic conduit 117. Conversely, in exemplary embodiments, when the operator inputs are actuated in a manner which commands that the secondary function devices be powered, without commanding that the primary device be powered, the power machine 10 provides pressurized hydraulic fluid to the implement via hydraulic conduit 117, with the hydraulic fluid being returned through the first hydraulic conduit 116. A third hydraulic conduit 118 provides an additional return line to receive hydraulic fluid from the implement 20. This third hydraulic conduit 118 is sometimes known as a case drain line, as on some implements it provides a path for return hydraulic flow for a primary device such as a hydraulic motor.

Implement 20 has first, second, and third hydraulic conduits 120, 121, and 122 that are configured to be hydraulically coupled to the first, second and third hydraulic conduits 116, 117 and 118, respectively on the power machine 10 via a hydraulic interface 123. The hydraulic interface 123 can include any suitable coupling devices to couple the conduits together. Implement also has an implement controller 128 that, in one embodiment, is a microprocessor based electronic controller capable of communicating with the controller 105 onboard the power machine Implement controller 128 is configured to communicate with controller 105 onboard power machine 10 when the implement controller 128 is coupled to the power machine via electrical interface 129. Implement controller 128 is configured to provide information to the power machine about the implement 20 and control various devices on the implement 20, as is discussed below.

Implement 20 includes a primary function device or actuator 125 and one or more secondary function devices or actuators 130, each of which is in hydraulic communication with a control circuit 135. The primary function actuator 125 illustratively includes a hydraulic component, such as a hydraulic motor that is operably coupled to and powers a primary tool 126. The primary tool generally performs the primary work of the implement and the primary function actuator 125 generally consumes more hydraulic power than the secondary function actuators 130. The secondary function actuators 130 illustratively include hydraulic components such as hydraulic cylinders or other hydraulic actuators used to position or move the primary tool 126. However, the disclosed embodiments are not limited to particular types of primary and secondary functions or devices and the concepts disclosed may be usefully applied to other configurations and implements.

In accordance with disclosed embodiments, implement 20 also includes a hydraulic flow control circuit 135 that controls the flow of hydraulic fluid within implement 20 to power the primary function actuator 125 and the secondary actuators 130 in response to the signals provided by the operator inputs 110. More particularly, the hydraulic flow control circuit 135 controls the flow of hydraulic fluid to the secondary function actuators 130 to accommodate situations where the primary function actuator 125 is either being actuated or not actuated.

Figures 1, 2:
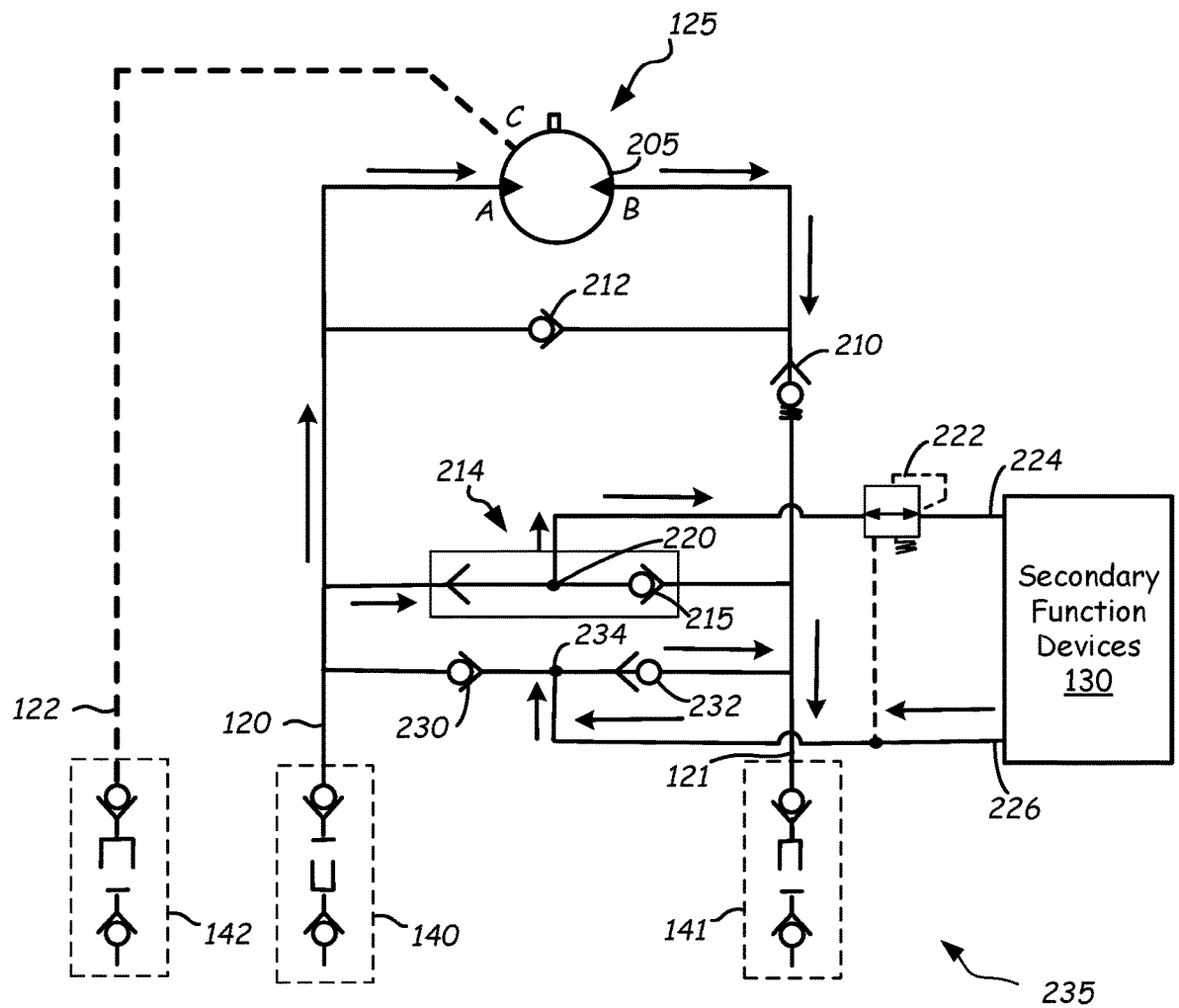
Figure 2:
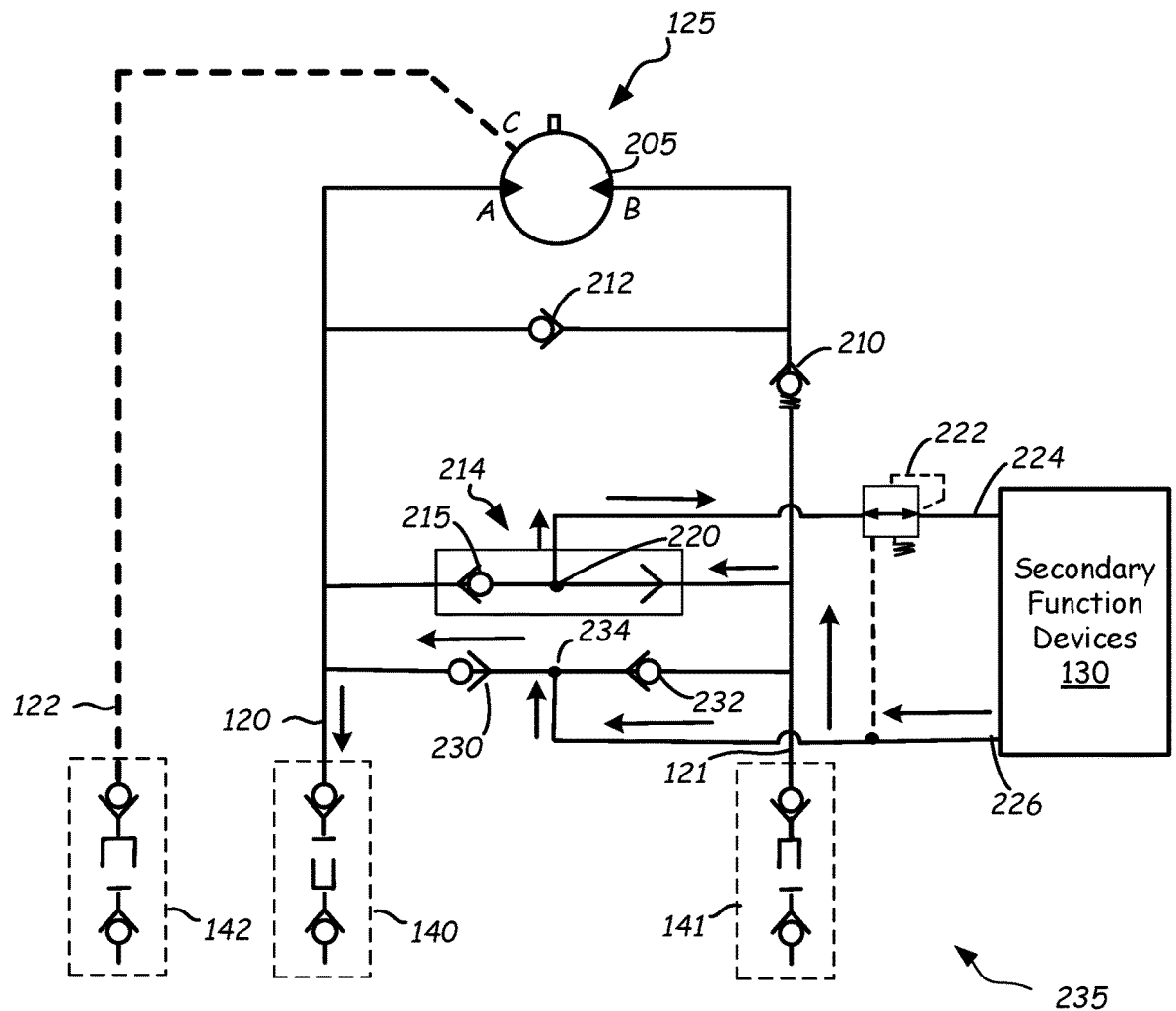

Referring now to FIGS. 2-1 and 2-2, shown is a hydraulic schematic diagram illustrating hydraulic components on implement 20, shown in FIG. 1, including components of hydraulic flow control circuit 235, which is a first embodiment of flow control circuit 135 shown in FIG. 1. Couplers 140, 141 and 142 of hydraulic interface 123 provide connection between hydraulic source 115 and the hydraulic flow control circuit 235. FIG. 2-1 illustrates the operation of hydraulic flow control circuit 235 when both the primary function device 125 and the secondary function devices 130 are commanded to operate. FIG. 2-2 illustrates the operation of hydraulic flow control circuit 235 when the secondary function devices are commanded, for example to adjust a position of the tool 126, but operation of the primary function device 125 is not commanded.

As shown, in this example embodiment, primary function device or actuator 125 is a hydraulically driven motor 205. Motor 205 can be a motor for rotating a cutting tool, for example. Motor 205 has an inlet port A, and outlet port B, and a case drain port C. The inlet port A is in communication with first conduit 120 such that it receives hydraulic fluid under pressure when controller 105 causes hydraulic power source 115 to provide hydraulic fluid via conduit 116 and coupler 140 as is illustrated in FIG. 2-1. Outlet port B is in communication with second conduit 121, through a reverse flow check valve 210, to provide return flow from the motor through coupler 141 and conduit 117. Case drain port C is in communication with the third conduit 122, which connects through coupler 142 to conduit 118, to provide a return to tank from any leakage in the case of motor 205. In the illustrated embodiment, a check valve 210 prevents hydraulic fluid under pressure from traveling through the motor in the reverse direction. A second check valve 212 is positioned between the motor inlet and outlet ports and functions as an anti-cavitation device.

Still referring to FIG. 2-1, to provide hydraulic fluid to power the secondary function actuators or devices 130, a shuttle valve 214 is coupled between the first conduit 120 and the second conduit 121, with the center connection 220 of the shuttle valve 214 coupled to an inlet 224 to the circuit of the secondary function devices 130, optionally through a pressure reducing valve 222. The pressurized hydraulic fluid in conduit 120 shifts the poppet 215 of shuttle valve 214 to provide flow of hydraulic fluid from conduit 120, through center connection 220, to inlet 224 of the secondary function devices circuit, while preventing flow from second conduit 121 through the shuttle valve. A pressure reducing valve 222 can be beneficial in providing pressurized hydraulic fluid to certain hydraulic circuit components, for example to cylinder type actuators that can be included in secondary function devices 130. However, pressure reducing valves are not required in this or some other embodiments.

Figures 2, 3:
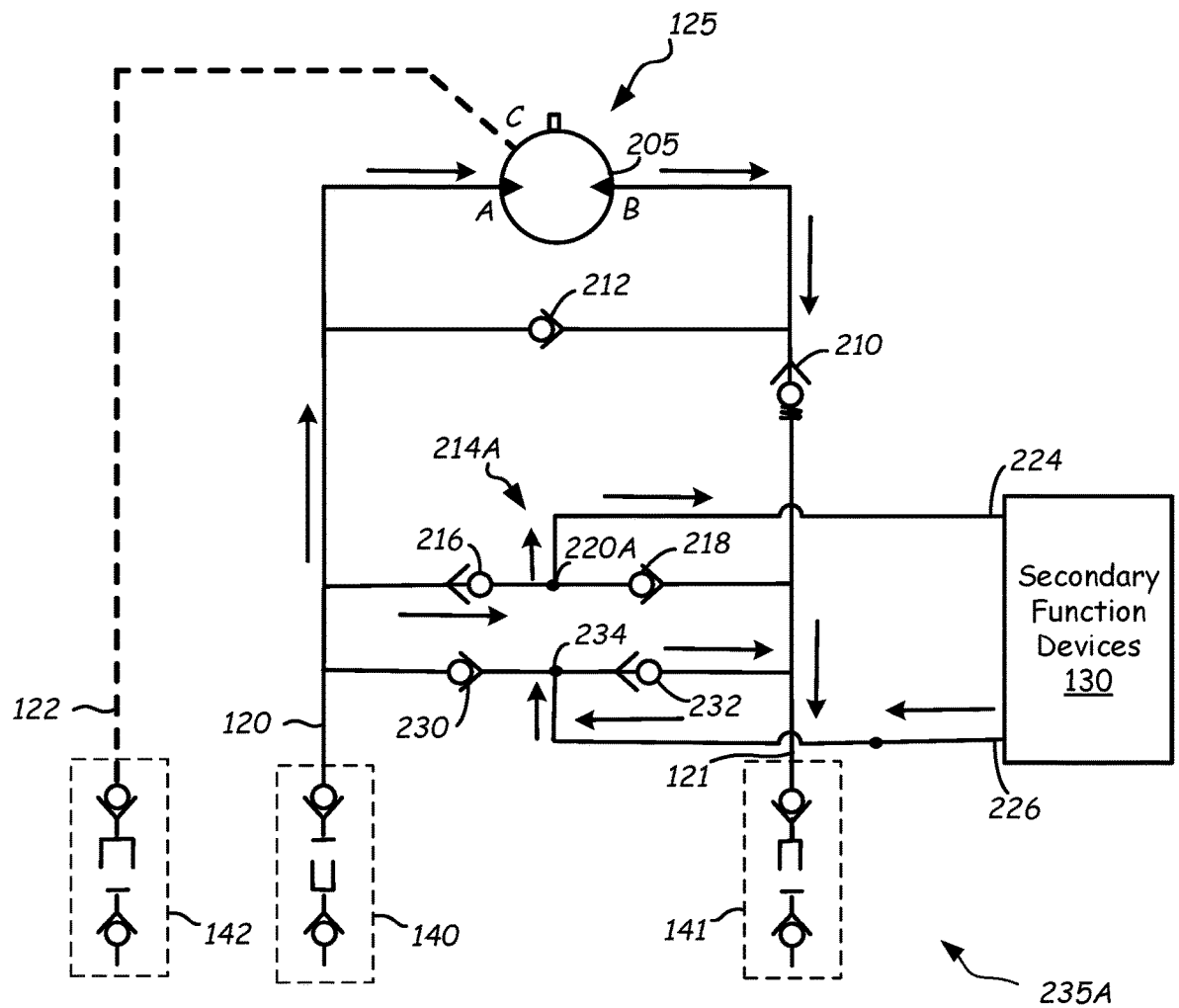
Figures 2, 3, 4:
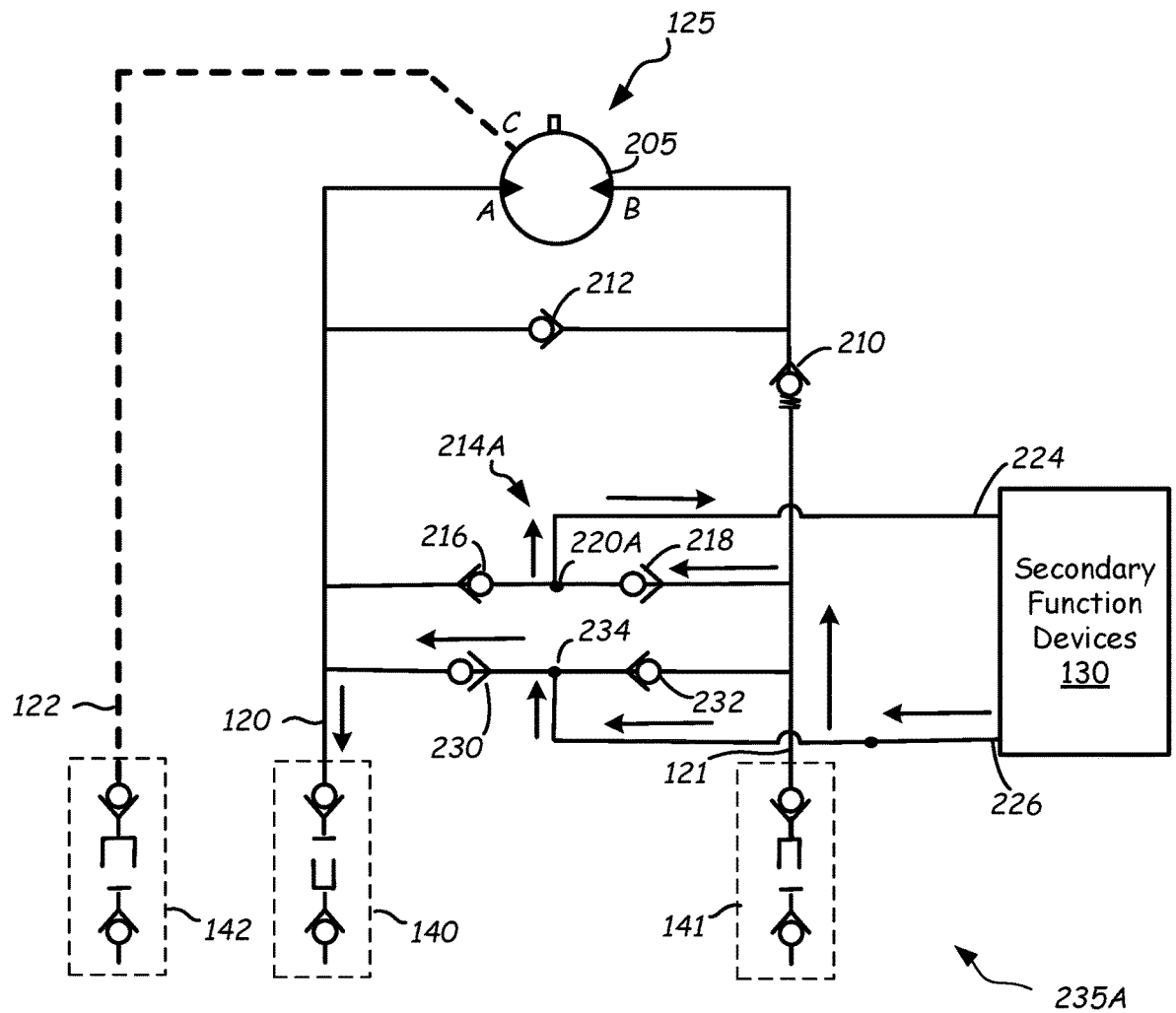
Figures 1, 3:
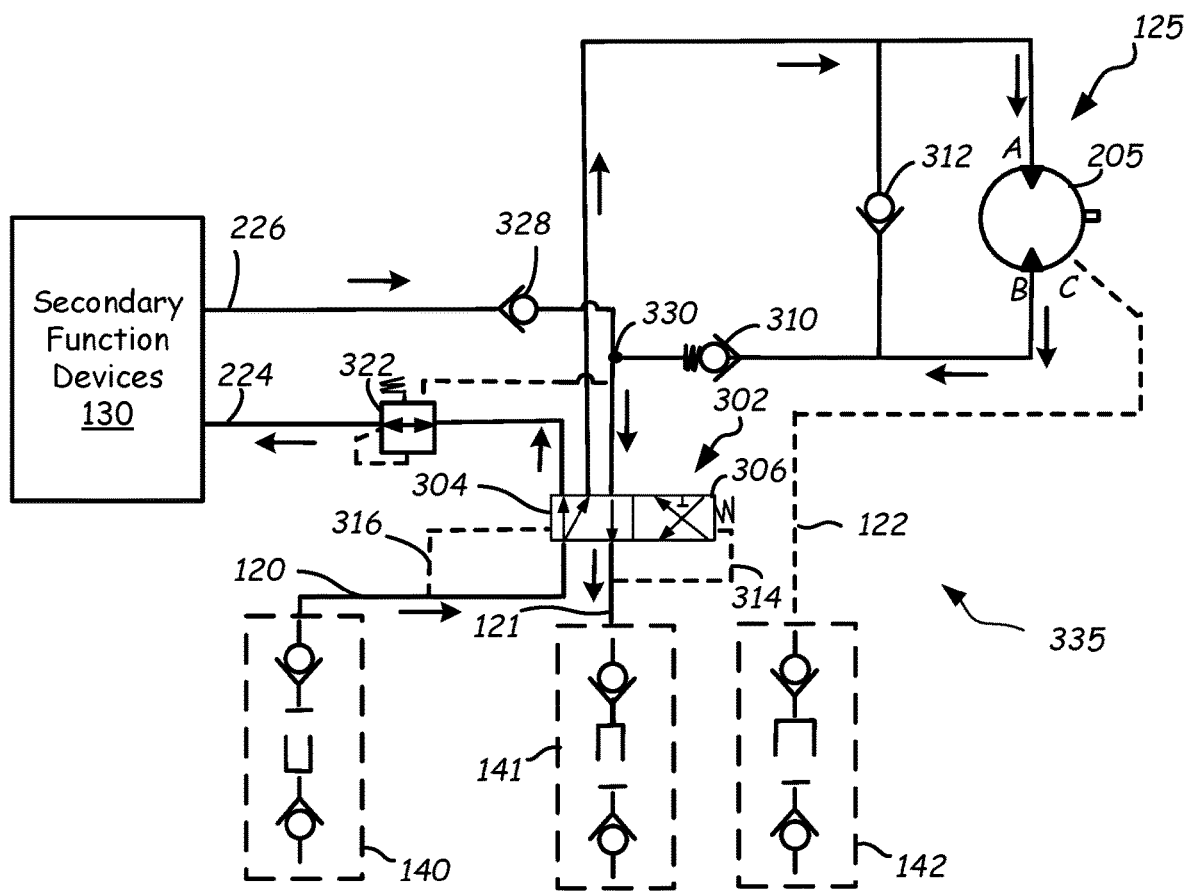
Figures 2, 3:
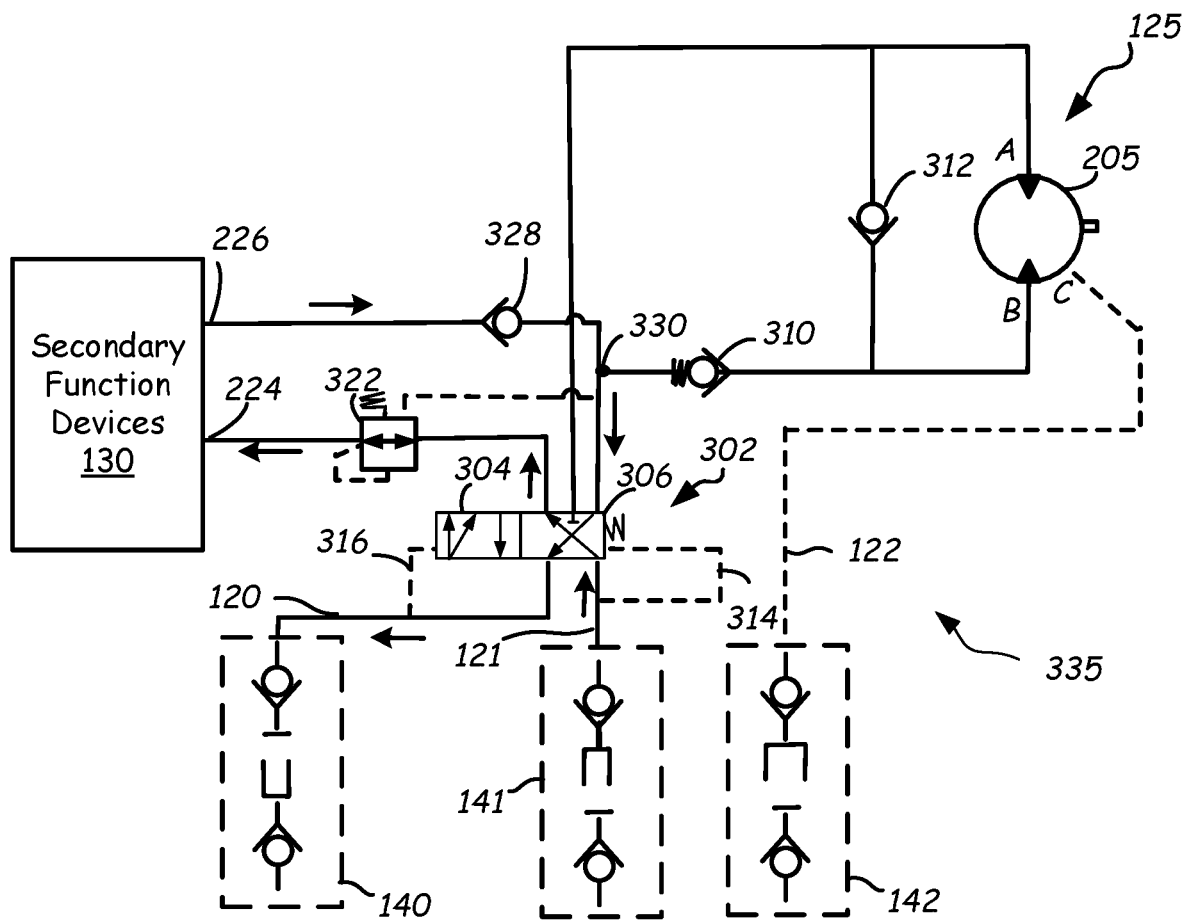
Figures 1, 4:
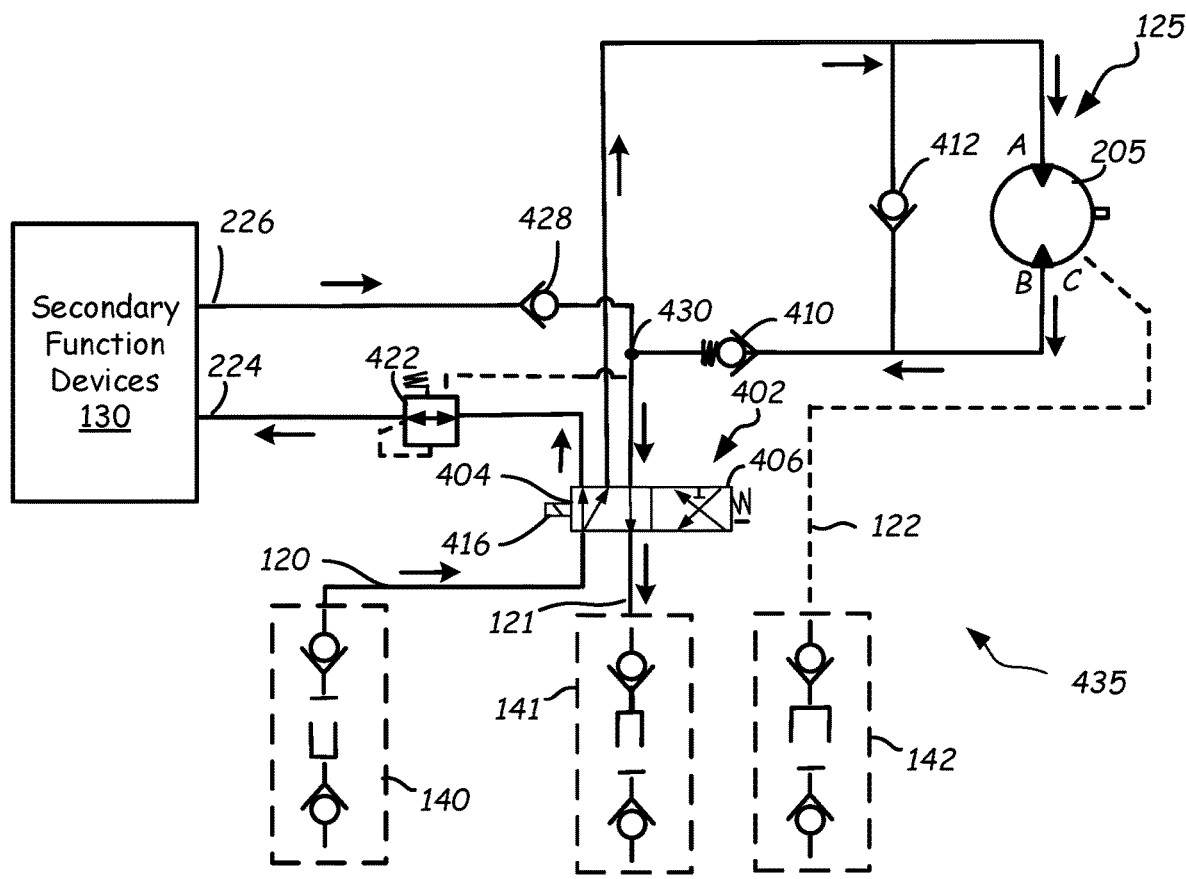
Figures 2, 4:
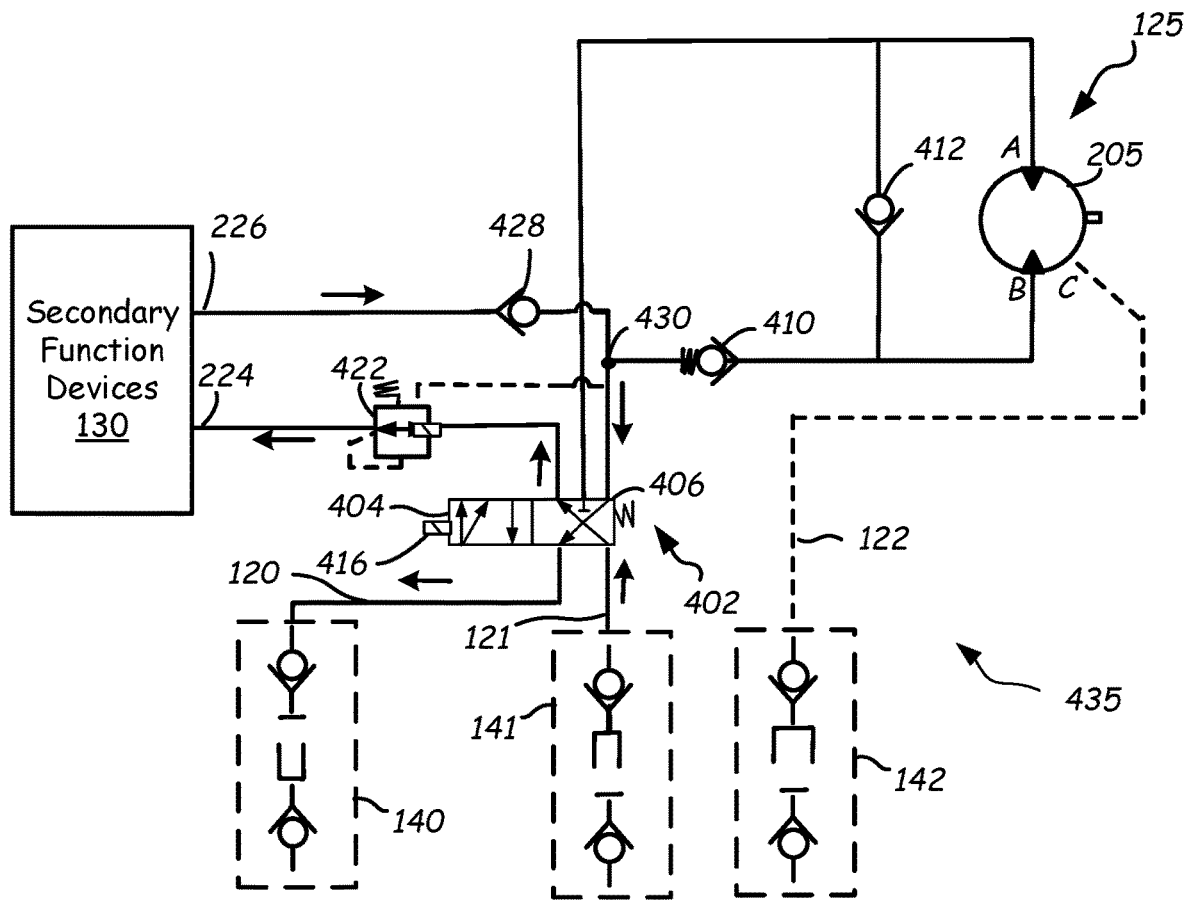

In a variation embodiment of hydraulic flow control circuit 235, shown as hydraulic flow control circuit 235A in FIGS. 2-3 and 2-4, a valve configuration 214A including two inwardly facing check valves 216 and 218 is used instead of a shuttle valve 214. In this alternate embodiment, the pressurized hydraulic fluid in conduit 120 opens check valve 216, providing flow of hydraulic fluid from center connection 220 to inlet 224 of the secondary function devices circuit. This also closes check valve 218 to prevent flow of hydraulic fluid directly into conduit 121. To illustrate that a pressure reducing valve is not required in all embodiments, pressure reducing valve 222 shown in FIGS. 2-1 and 2-2 is omitted from hydraulic flow control circuit 235A. However, a pressure reducing valve can be included and provides benefits in some designs.

Referring to FIGS. 2-1 and 2-3, outlet or return 226 from the circuit of the secondary function devices 130 is coupled to a center node 234 between two outwardly facing check valves 230 and 232. The check valve 230 is coupled between the center node 234 and the first conduit 120, while the check valve 232 is coupled between the center node 234 and the second conduit 121. The pressure of the hydraulic fluid returning from the secondary devices 130 opens the check valve 232 and allows the hydraulic fluid from the secondary devices to be combined with the fluid in conduit 121 returning from the motor 205. Pressure in conduit 120 prevents check valve 230 from opening in this state.

Referring more specifically now to FIGS. 2-2 and 2-4, in a second state in which the primary function device 125 is not commanded to operate, but the secondary function devices are commanded to operate by controller 105 responsive to operator inputs 110, the controller controls the hydraulic source 115 to provide pressurized hydraulic fluid to the implement 20 via conduit 117, coupler 141 and conduit 121. In circuit 235, the pressurized fluid in conduit 121 closes check valves 210 and 232, and shifts the poppet 215 of the shuttle valve 214, providing a fluid path from the conduit 121 to center node 220 and to the inlet 224 of the circuit of the secondary function devices 130, while preventing flow to first conduit 120. In circuit 235A, the pressurized fluid in conduit 121 closes check valves 210 and 232, preventing the fluid from being provided to motor 205 or directly to first conduit 120. The pressurized fluid in the second conduit 121 opens check valve 218, providing a fluid path from the conduit 121 to the inlet 224 of the circuit of the secondary function devices 130. Check valve 216 closes and prevents flow directly into first conduit 120. These configurations of circuits 235 and 235A allow the secondary function devices to operate without requiring operation of the primary function device 125. The pressure of the hydraulic fluid returning from the circuit of the secondary devices 130 at outlet 226 opens the check valve 230 and allows the hydraulic fluid from the secondary devices to return to the power machine through the first conduit 120.

Referring now to FIGS. 3-1, 3-2, 4-1 and 4-2, shown are hydraulic schematic diagrams of alternate embodiments of the hydraulic flow control circuit 135. Hydraulic flow control circuit 335 (shown in FIGS. 3-1 and 3-2) and hydraulic flow control circuit 435 (shown in FIGS. 4-1 and 4-2) are configured to function similarly to hydraulic flow control circuit 235 discussed above. In all three circuit embodiments, to provide pressurized hydraulic fluid to both of the primary function device 125 and to the secondary function devices 130 on the implement 20, pressurized hydraulic fluid from hydraulic source 115 on power machine 10 is supplied through first coupler 140 and first conduit 120, and returned to the power machine through second conduit 121 and second coupler 141. However, to provide pressurized hydraulic fluid to only the secondary function devices 130, and not the primary function device 125, pressurized hydraulic fluid from hydraulic source 115 is supplied through second coupler 141 and second conduit 121, and returned to the power machine through first conduit 120 and first coupler 140. As will be discussed further below, hydraulic flow control circuit 435 differs from hydraulic flow control circuit 335 only with regards to a valve 302 in control circuit 335 being pilot pressure operated, while a corresponding valve 402 in control circuit 435 is controlled by a solenoid 416 responsive to control signals from implement controller 128.

Referring first to FIGS. 3-1 and 4-1, primary function actuator or device 125 is again a hydraulically driven motor 205 with similar connections as discussed above. The outlet port B of motor 205 is again coupled in series to a reverse flow check valve 310/410 to allow return flow from the motor while preventing pressurized fluid from flowing toward the outlet port side of the motor. Also, as was the case with control circuit 235, in control circuits 335/435, a second check valve 312/412 is positioned between the motor inlet and outlet ports and functions as an anti-cavitation device. However, in circuits 335 and 435, the connections of the motor inlet port A and the motor outlet port B to conduits 120 and 121 are controlled by a two-position valve 302/402. In some exemplary embodiments, the valve 302/402 is a two-position five-way valve.

FIGS. 3-1 and 4-1 illustrate the respective control circuits in states in which operation of the primary function device 125 is commanded and pressurized hydraulic fluid is supplied through coupler 140 and first conduit 120. In this state, the valve 302/402 is in a first position 304/404, controlled either by the pilot pressure line 316 (FIG. 3-1) coupled to first conduit 120 or by a solenoid control signal from implement controller 128 to solenoid 416 (FIG. 4-1). In the first position 304/404, valve 302/402 supplies pressurized hydraulic fluid from conduit 120 to both of the inlet port A of motor 205 and to inlet 224 of the circuit of the secondary function devices 130. As was the case with control circuit 235, pressurized hydraulic fluid is provided to secondary function devices 130 optionally through a pressure reducing valve 322/422. The outlet 226 of the secondary function devices circuit is coupled, through a check valve 328/428, to the outlet of motor 205, through check valve 310/410, at a node 330/430 of a conduit to valve 302/402. In the illustrated first position 304/404, the valve 302/402 couples these outlets to second conduit 121. Thus, the combined return flow from the primary function device and the secondary function devices is returned to the power machine through second conduit 121, second coupler 141, and conduit 117.

FIGS. 3-2 and 4-2 illustrate the control circuits 335/435 in states in which operation of the primary function device is not commanded but the secondary function devices are commanded to operate by controller 105 responsive to operator inputs 110. In this second state, the controller 105 controls the hydraulic source 115 to provide pressurized hydraulic fluid to the implement 20 via conduit 117, coupler 141 and conduit 121. In this state, valve 302/402 is in a second position 306/406, controlled either by the pilot pressure line 314 (FIG. 3-2) coupled to the second conduit 121 or by a solenoid control signal from the implement controller to solenoid 416 (FIG. 4-2).

In the second position 306/406, valve 302/402 supplies pressurized hydraulic fluid from conduit 121 only to inlet 224 of the circuit of the secondary function devices 130, through pressure reducing valve 322/422, and not to the inlet port A of motor 205. The outlet 226 of the secondary function devices circuit is coupled, through check valve 328/428 and valve 302/402, to first conduit 120. Reverse flow check valve 310 prevents the flow of hydraulic fluid returning from the secondary function devices 130 from reaching motor 205. The return flow from the secondary function devices is returned to the power machine through first conduit 120, first coupler 140, and conduit 116.

Figures 1, 5:
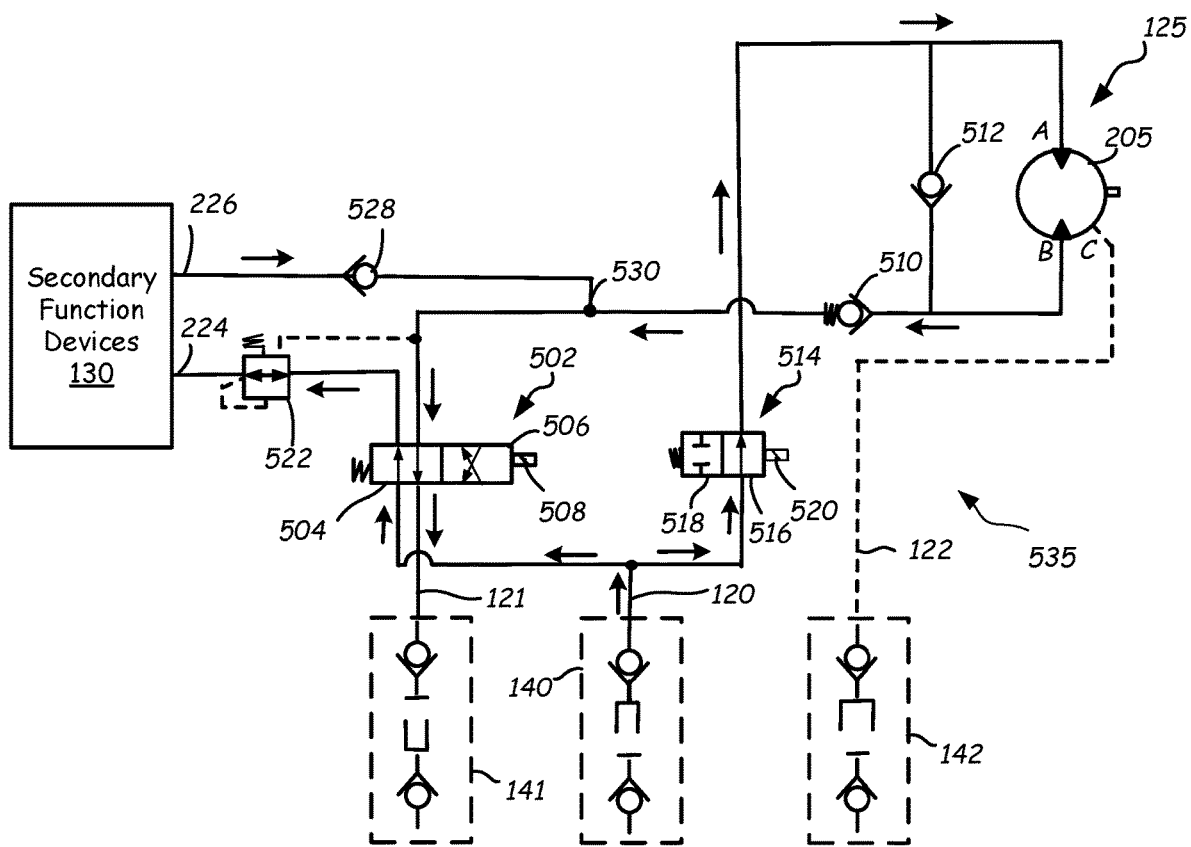
Figures 2, 5:
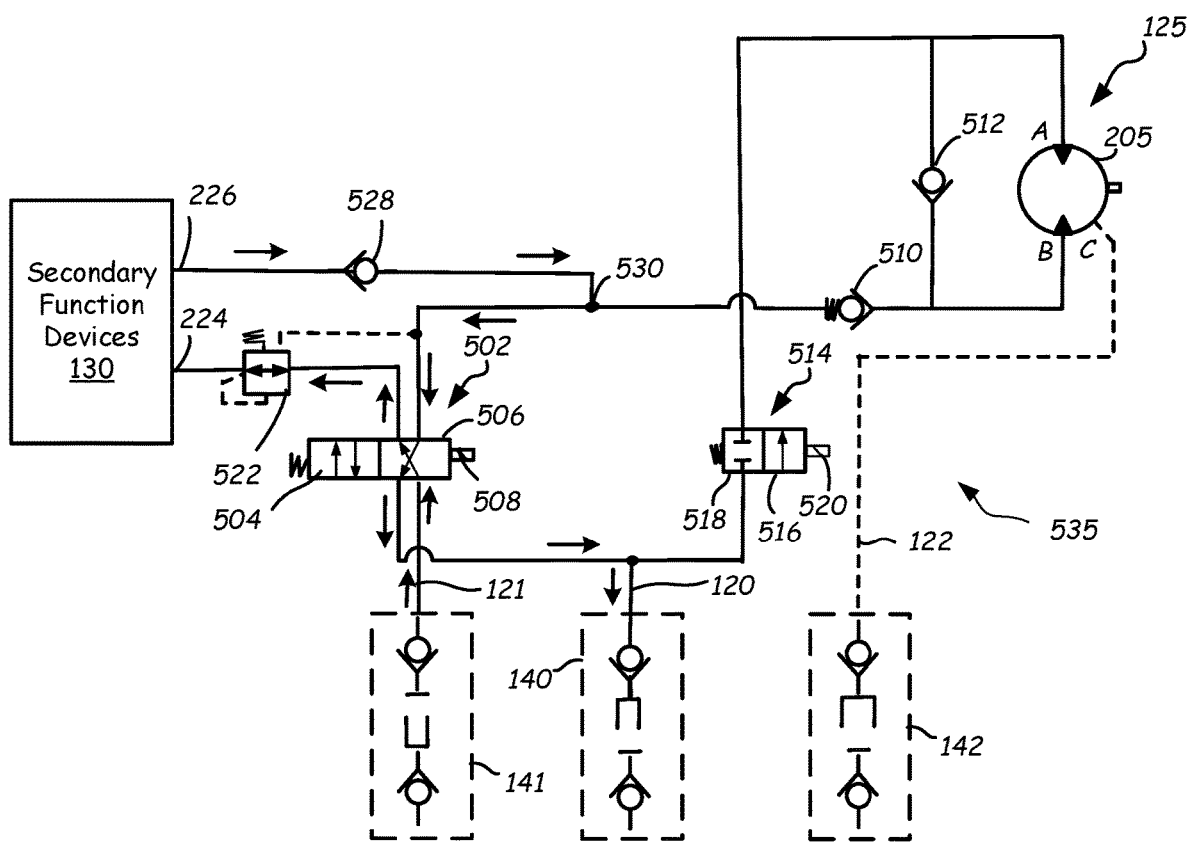

Referring now to FIGS. 5-1 and 5-2, shown is a hydraulic schematic diagram of yet another alternate embodiment of the hydraulic flow control circuit 135. Hydraulic flow control circuit 535 is configured to function similarly to hydraulic flow control circuits 335 and 435, but utilizing two control valves instead of the one control valve 302/402 included in circuits 335 and 435. However, as was the case with control circuits 235, 335 and 435, control circuit 535 is configured such that, to provide pressurized hydraulic fluid to both of the primary function device 125 and to the secondary function devices 130 on the implement 20, pressurized hydraulic fluid from hydraulic source 115 on power machine 10 is supplied through first coupler 140 and first conduit 120, and returned to the power machine through second conduit 121 and second coupler 141. To provide pressurized hydraulic fluid to only the secondary function devices 130, and not the primary function device 125, pressurized hydraulic fluid from hydraulic source 115 is supplied through second coupler 141 and second conduit 121, and returned to the power machine through first conduit 120 and first coupler 140.

In control circuit 535, primary function actuator or device 125 is again a hydraulically driven motor 205 with similar connections as discussed above. The outlet port B of motor 205 is again coupled in series to a reverse flow check valve 510 to allow return flow from the motor while preventing pressurized fluid from flowing toward the outlet port side of the motor. Also, a second check valve 512 is again positioned between the motor inlet and outlet ports and functions as an anti-cavitation device. Control circuit 535 differs from previously discussed control circuit embodiments, and particularly with reference to circuits 335 and 435, in that the supply of pressurized hydraulic fluid to each of the circuit for the secondary function devices 130 and to the motor 205 are controlled by different two-position valves 502 and 514. Valve 502 controls the supply of pressurized hydraulic fluid to secondary function devices 130 and has a first position 504 and a second position 506, which are selected using a solenoid 508 responsive to a first solenoid control signal from implement controller 128. Valve 514 controls the supply of pressurized hydraulic fluid to motor 125 and has a first position 516 and a second position 518, which are selected using a solenoid 520 responsive to a second solenoid control signal from implement controller 128.

FIG. 5-1 illustrates control circuit 535 in a state in which operation of the primary function device 125 is commanded and pressurized hydraulic fluid is supplied through coupler 140 and first conduit 120. In this state, each of valves 502 and 514 is in their respective first position. In this state, pressurized hydraulic fluid flows from first conduit 120 through valve 514 to the inlet port A of motor 205, and exits outlet port B of the motor. The flow of hydraulic fluid out of motor 205 opens check valve 510 allowing the return flow toward node 530 of a conduit to valve 506. Also in this state, pressurized hydraulic fluid flows from first conduit 120 through valve 502, and optionally through pressure reducing valve 522, to the inlet 224 of the circuit of the secondary function devices 130. The outlet 226 of the secondary function devices circuit is coupled, through a check valve 528, to node 530 where the hydraulic fluid returning from the secondary function devices 130 is combined with the hydraulic fluid returning from the primary function device 125 (e.g., from motor 205). The combined return flow from the primary function device and the secondary function devices is returned to the power machine through valve 502, second conduit 121, second coupler 141, and conduit 117.

FIG. 5-2 illustrates the control circuit 535 in a state in which operation of the primary function device is not commanded but the secondary function devices are commanded. In this second state, the controller 105 controls the hydraulic source 115 to provide pressurized hydraulic fluid to the implement 20 via conduit 117, coupler 141 and conduit 121. In this state, each of valves 502 and 514 is in their respective second position. Valve 514 and check valve 510 block the flow of hydraulic fluid to motor 205. Valve 502 couples second conduit 121, optionally through the pressure reducing valve 522, to the inlet 224 of the circuit of the secondary function devices 130. Hydraulic fluid returning from secondary function devices 130 is coupled to the first conduit 120 by valve 502 such that the hydraulic fluid is returned to the power machine through first coupler 140 and conduit 116.

Although the present invention has been described with reference to preferred embodiments, workers skilled in the art will recognize that changes may be made in form and detail without departing from the spirit and scope of the invention.

What is claimed is:

1. A hydraulic system for selectively providing pressurized hydraulic fluid flow to actuators on an implement configured to be hydraulically coupled to a power machine, the implement having a primary function actuator and at least one secondary function actuator, wherein the hydraulic system comprises:
   a hydraulic interface including first and second conduits coupleable to the power machine, wherein each of the first and second conduits are configured to selectively receive pressurized hydraulic fluid from the power machine, and wherein the implement is configured to receive pressurized hydraulic fluid flow from only one of the first and second conduits at a time;
   a hydraulic flow control circuit configured to selectively control pressurized hydraulic fluid flow to and from the primary function actuator and to and from at least one secondary function actuator in first and second modes of operation;
   wherein in the first mode of operation the hydraulic flow control circuit is configured to receive pressurized hydraulic fluid flow from the first conduit and to provide the pressurized hydraulic fluid flow to the primary function actuator and to the at least one secondary function actuator, and wherein in the first mode of operation the hydraulic flow control circuit is configured to direct return flow of pressurized hydraulic fluid from the primary function actuator and from the at least one secondary function actuator through the second conduit for return to the power machine;
   wherein in the second mode of operation the hydraulic flow control circuit is configured to receive pressurized hydraulic fluid flow from the second conduit, to prevent flow of pressurized hydraulic fluid flow to the primary function actuator, and to provide the pressurized hydraulic fluid flow to the at least one secondary function actuator, and wherein in the second mode of operation the hydraulic flow control circuit is configured to direct return flow of pressurized hydraulic fluid from the at least one secondary function actuator through the first conduit for return to the power machine.

2. The hydraulic system of claim 1, wherein the primary function actuator includes a motor having an inlet port (A) and an outlet port (B), and wherein the hydraulic flow control circuit is configured to prevent pressurized hydraulic fluid flow into the outlet port in both of the first and second modes of operation.

3. The hydraulic system of claim 2, wherein the hydraulic interface includes a third conduit coupleable to the power machine, and wherein the motor of the primary function actuator is in communication with the third conduit to allow hydraulic fluid leaked in the motor to exit the motor.

4. The hydraulic system of claim 2, wherein the hydraulic flow control circuit includes a first blocking device coupled to the outlet port (B) of the motor configured to prevent pressurized hydraulic fluid flow into the outlet port.

5. The hydraulic system of claim 4, wherein the hydraulic flow control circuit includes a shuttle valve coupled between the first conduit and the second conduit, the hydraulic flow control circuit configured such that a center connection of the shuttle valve provides pressurized hydraulic fluid flow to the at least one secondary function actuator from the first conduit in the first mode of operation and from the second conduit in the second mode of operation.

6. The hydraulic system of claim 5, wherein the hydraulic flow control circuit is configured such that return flow from the at least one secondary function actuator is provided to a center node between second and third blocking devices, the second blocking device coupled between the center node and the first conduit and the third blocking device coupled between the center node and the second conduit, the second and third blocking devices configured such that return flow from the at least one secondary function actuator is directed through the second conduit in the first mode of operation and through the first conduit in the second mode of operation.

7. The hydraulic system of claim 6, wherein the first, second and third blocking devices are check valves.

8. The hydraulic system of claim 4, wherein the hydraulic flow control circuit includes a first two-position control valve, the first two-position control valve having a first position in the first mode of operation and a second position in the second mode of operation, wherein in the first mode of operation the first two-position control valve couples the first conduit to the at least one secondary function actuator to provide the pressurized hydraulic fluid flow to the at least one secondary function actuator, and wherein in the first mode of operation the first two-position control valve couples return flow of pressurized hydraulic fluid from the primary function actuator and from the at least one secondary function actuator to the second conduit for return to the power machine.

9. The hydraulic system of claim 8, wherein in the first mode of operation the first two-position control valve also couples the first conduit to the primary function actuator to provide the pressurized hydraulic fluid flow to the primary function actuator.

10. The hydraulic system of claim 8, wherein in the second mode of operation the first two-position control valve couples the second conduit to the at least one secondary function actuator to provide the pressurized hydraulic fluid flow to the at least one secondary function actuator, and wherein in the second mode of operation the first two-position control valve couples return flow of pressurized hydraulic fluid from the at least one secondary function actuator to the first conduit for return to the power machine.

11. The hydraulic system of claim 8, wherein the first two-position control valve is pilot operated and moves between the first position in the first mode of operation and the second position in the second mode of operation using pilot pressures in the first and second conduits.

12. The hydraulic system of claim 8, wherein the first two-position control valve is solenoid operated and moves between the first position in the first mode of operation and the second position in the second mode of operation responsive to control signals from an implement controller.

13. The hydraulic system of claim 8, wherein the hydraulic flow control circuit includes a second two-position control valve, the second two-position control valve having a first position in the first mode of operation and a second position in the second mode of operation, wherein in the first mode of operation the second two-position control valve couples the first conduit to the primary function actuator to provide the pressurized hydraulic fluid flow to the primary function actuator.

14. The hydraulic system of claim 4, wherein the hydraulic flow control circuit includes a valve configuration having two check valves coupled between the first conduit and the second conduit, the hydraulic flow control circuit configured such that a center connection of the check valves provides pressurized hydraulic fluid flow to the at least one secondary function actuator from the first conduit in the first mode of operation and from the second conduit in the second mode of operation.

15. A hydraulic system for selectively providing pressurized hydraulic fluid flow to actuators on an implement configured to be hydraulically coupled to a power machine, the implement having a primary function actuator and at least one secondary function actuator, wherein the hydraulic system comprises:
  a hydraulic interface including first and second conduits coupleable to the power machine using first and second couplers, wherein each of the first and second conduits are configured to selectively receive pressurized hydraulic fluid from the power machine one at a time, and wherein the first conduit is coupled to an inlet port (A) of the primary function actuator to provide pressurized hydraulic fluid to the primary function actuator;
  a hydraulic flow control circuit configured to selectively control pressurized hydraulic fluid flow to and from the primary function actuator and to and from at least one secondary function actuator in first and second modes of operation, the hydraulic flow control circuit comprising:
    a first flow blocking device coupled between an outlet port (B) of the primary function actuator and the second conduit, the first flow blocking device allowing flow from the first conduit through the primary function actuator to exit the outlet port (B) and return to the second conduit, but the first flow blocking device blocking flow from the second conduit into the outlet port (B);
    a shuttle valve coupled between the first conduit and the second conduit, a center connection of the shuttle valve being coupled to an inlet to a circuit of the at least one secondary function actuator such that the center connection of the shuttle valve provides pressurized hydraulic fluid flow to the at least one secondary function actuator selectively and one at a time from the first conduit in the first mode of operation and from the second conduit in a second mode of operation;

second and third flow blocking devices coupled together at a center node, the second flow blocking device coupled between the center node and the first conduit, and the third flow blocking device coupled between the center node and the second conduit, the second and third flow blocking devices configured such that return flow from the at least one secondary function actuator is directed selectively through the second conduit in the first mode of operation and through the first conduit in the second mode of operation;

wherein in the first mode of operation the hydraulic flow control circuit is configured to receive pressurized hydraulic fluid flow from the first conduit and to provide the pressurized hydraulic fluid flow to the primary function actuator and to the at least one secondary function actuator, and wherein in the first mode of operation the hydraulic flow control circuit is configured to direct return flow of pressurized hydraulic fluid from the primary function actuator and from the at least one secondary function actuator through the second conduit for return to the power machine;

wherein in the second mode of operation the hydraulic flow control circuit is configured to receive pressurized hydraulic fluid flow from the second conduit, to use the first flow blocking device to prevent flow of pressurized hydraulic fluid flow to the primary actuator, and to provide the pressurized hydraulic fluid flow to the at least one secondary function actuator, and wherein in the second mode of operation the hydraulic flow control circuit is configured to direct return flow of pressurized hydraulic fluid from the at least one secondary function actuator through the first conduit for return to the power machine.

16. The hydraulic system of claim 15, wherein the primary function actuator is a motor which powers a tool.

17. The hydraulic system of claim 16, wherein the at least one secondary function actuator is configured to position the tool.

18. The hydraulic system of claim 15, wherein the first, second and third flow blocking devices are check valves.

19. A hydraulic system for selectively providing pressurized hydraulic fluid flow to actuators on an implement configured to be hydraulically coupled to a power machine, the implement having a primary function actuator and at least one secondary function actuator, wherein the hydraulic system comprises:

a hydraulic interface including first and second conduits coupleable to the power machine using first and second couplers, wherein each of the first and second conduits are configured to selectively receive pressurized hydraulic fluid from the power machine one at a time, and wherein the first conduit is coupled to an inlet port (A) of the primary function actuator to provide pressurized hydraulic fluid to the primary function actuator;

a hydraulic flow control circuit configured to selectively control pressurized hydraulic fluid flow to and from the primary function actuator and to and from at least one secondary function actuator in first and second modes of operation, the hydraulic flow control circuit comprising:

a first flow blocking device coupled between an outlet port (B) of the primary function actuator and the second conduit, the first flow blocking device allowing flow from the first conduit through the primary function actuator to exit the outlet port (B) and return to the second conduit, but the first flow blocking device blocking flow from the second conduit into the outlet port (B);

a valve configuration comprising second and third flow blocking devices coupled between the first conduit and the second conduit, a center connection of the second and third flow blocking devices being coupled to an inlet to a circuit of the at least one secondary function actuator such that the center connection of the second and third flow blocking devices provides pressurized hydraulic fluid flow to the at least one secondary function actuator selectively and one at a time from the first conduit in the first mode of operation and from the second conduit in a second mode of operation;

fourth and fifth flow blocking devices coupled together at a center node, the fourth flow blocking device coupled between the center node and the first conduit, and the fifth flow blocking device coupled between the center node and the second conduit, the fourth and fifth flow blocking devices configured such that return flow from the at least one secondary function actuator is directed selectively through the second conduit in the first mode of operation and through the first conduit in the second mode of operation;

wherein in the first mode of operation the hydraulic flow control circuit is configured to receive pressurized hydraulic fluid flow from the first conduit and to provide the pressurized hydraulic fluid flow to the primary function actuator and to the at least one secondary function actuator, and wherein in the first mode of operation the hydraulic flow control circuit is configured to direct return flow of pressurized hydraulic fluid from the primary function actuator and from the at least one secondary function actuator through the second conduit for return to the power machine;

wherein in the second mode of operation the hydraulic flow control circuit is configured to receive pressurized hydraulic fluid flow from the second conduit, to use the first flow blocking device to prevent flow of pressurized hydraulic fluid flow to the primary actuator, and to provide the pressurized hydraulic fluid flow to the at least one secondary function actuator, and wherein in the second mode of operation the hydraulic flow control circuit is configured to direct return flow of pressurized hydraulic fluid from the at least one secondary function actuator through the first conduit for return to the power machine.

\* \* \* \* \*